United States Patent [19]

Roth et al.

[11] 4,453,249

[45] Jun. 5, 1984

[54] SYSTEM FOR BINARY DATA TRANSMISSION

[75] Inventors: Dieter Roth, Pforzheim; Herbert Schorb, Karlsruhe; Herbert Kloss, Wörth, all of Fed. Rep. of Germany

[73] Assignee: International Standard Electric Corporation, New York, N.Y.

[21] Appl. No.: 347,135

[22] Filed: Feb. 9, 1982

[30] Foreign Application Priority Data

Feb. 11, 1981 [DE] Fed. Rep. of Germany ....... 3104762

[51] Int. Cl.³ .................... H04L 1/10; G06F 11/10
[52] U.S. Cl. .................................................. 371/37
[58] Field of Search .......................... 371/37, 39, 40

[56] References Cited

PUBLICATIONS

Peterson, W. W. and Weldon, E. I., *Error Correcting Codes,* the M.I.T. Press: Cambridge, Mass., 1972, 230–232, 256–261, 289–308.

*Primary Examiner*—Charles E. Atkinson
*Assistant Examiner*—Clark A. Jablon
*Attorney, Agent, or Firm*—John T. O'Halloran; Alfred C. Hill

[57] ABSTRACT

A binary data transmission system uses a code consisting of n-bit code words of a quasi-cyclic code with k information bits and n-k check bits. An encoder and a decoder with an error-detection and -correction facility are provided which use a quasi-cyclic code that has a high error-correcting capacity and requires little storage space.

20 Claims, 5 Drawing Figures

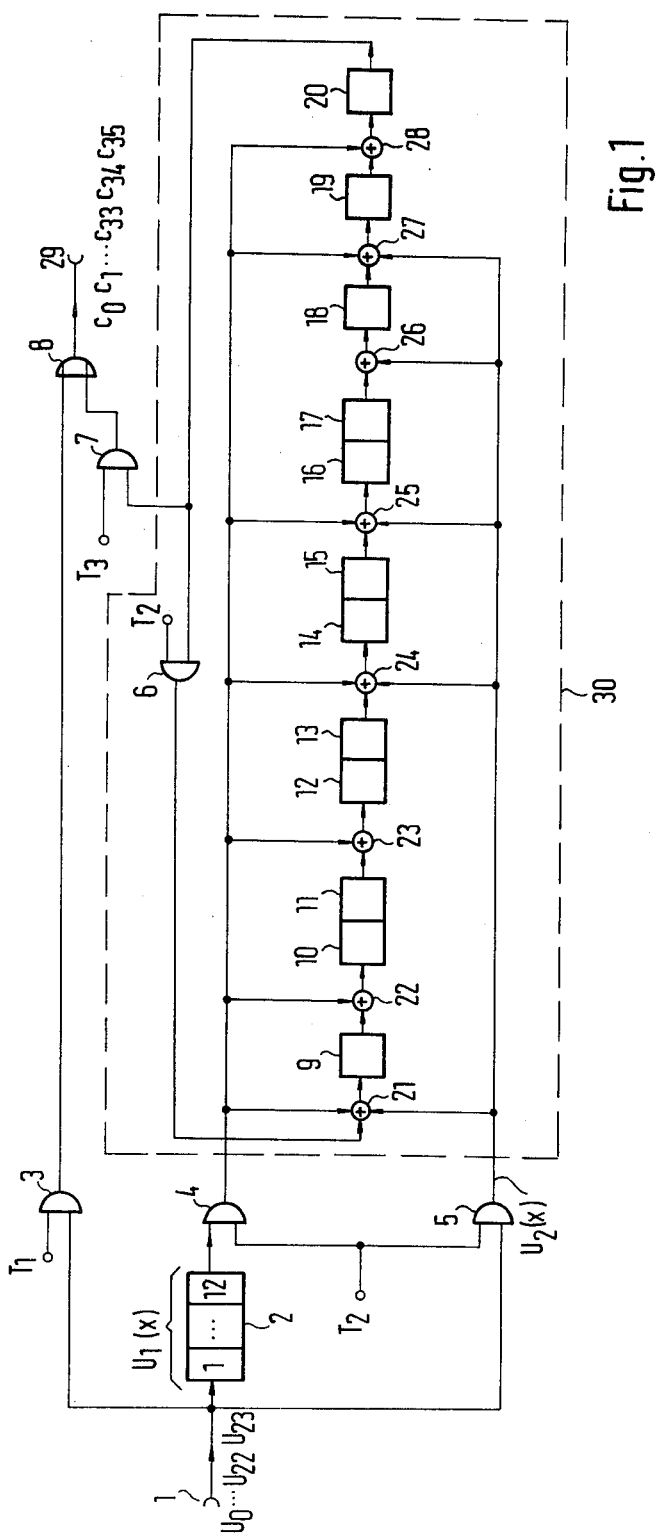
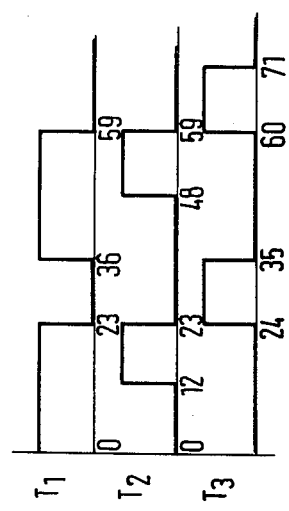
Fig.1
Fig.2

SYSTEM FOR BINARY DATA TRANSMISSION

BACKGROUND OF THE INVENTION

The present invention relates to a system for binary data transmission containing an encoder and a decoder with an error-detection and -correction facility.

PRIOR ART

In such systems, there is always a certain probability of error due to unavoidable noise. To detect and correct erroneous binary information during the decoding process, a great number of techniques have been proposed, e.g., in a book by W. W. Peterson and E. I. Weldon, "Error-Correcting Codes", The M.I.T. Press, Cambridge, Mass., USA, second edition, 1972, on pages 289 to 308.

By the decoding techniques for binary Bose-Chaudhuri-Hocquenghem (BCH) codes described there, which are based on the Berlekamp-Massey algorithm, all up to f-fold errors in a code word can be corrected as a function of the minimum distance m between all code words, with $m=2f+1$.

If binary BCH codes are used, the encoders and decoders can be constructed from simple shift-register circuits, because BCH codes are so-called cyclic codes.

By contrast, decoder circuits for shortened BCH codes, which are not cyclic, require more complicated logic and control circuitry.

SUMMARY OF THE INVENTION

An object of the present invention is to provide a system of the above kind which utilizes the potential error-correcting capacity of the code in the decoder, requires minimum storage space, and keeps the number of correction steps as small as possible.

A feature of the present invention is the provision of a system for binary data transmission comprising: an encoder including a first k/2-stage shift register means to convert an input binary signal to be transmitted into n-bit code words of a quasi-cyclic code with k information bits, where n and k are different integers greater than one; and a decoder having an error-detection and error-correction arrangement including a second k/2-stage shift register means having an input receiving the n-bit code words of the quasi-cyclic code to calcuate from each of the code words a syndrome whose value is used as an address of a location in a read-only memory means having a predetermined number of locations, the read-only memory means delivering from the addressed location a selected one of first information specifying the position of an erroneous bit in the information bits and second information terminating a correction, a code converter means coupled to the read-only memory means to convert the first information into a k-bit error pattern, modulo-2 adder means coupled to the code converter means and the input to add the error pattern to the information bits to produce corrected information bits, first means coupled to the second shift register, the read-only memory means and the modulo-2 adder means to enable locating and correcting a selected number of errors in the information bits by operating on each new corrected information bits as produced above by the read-only memory means, the code converter and the modulo-2 adder means, and second means coupled to the modulo-2 adder means and the read-only memory means to provide a corrected output signal from which the input binary signal can be derived in response to a selected one of the second information and corrected information bits after the selected number of errors have been corrected.

Through the error-correcting capability of the decoder, data can be transmitted with a smaller probability of error than that attainable with the known BCH code for an unchanged ratio between check bits and information bits. If the same requirements are placed on the probability of error as with BCH codes, the amount of information bits in a code word is greater, while the amount of check bits is correspondingly smaller. Thus, the amount of information bits capable of being transmitted in a unit of time increases.

Through the step-by-step error correction of the present invention, only about one seventh of the storage space needed with the known techniques is required to hold the correcting information.

Another advantage lies in the use of quasi-cyclic codes, which can be implemented using relatively simple shift-register circuits, similar to cyclic codes. In addition, the encoding circuit can be used to perform an essential part of the calculation of the syndromes in the decoder.

During decoding, all single and double errors and a considerable part of the triple errors in the information part of the received code word are corrected. The decoding scheme is designed so that of the correctable 4-fold and 5-fold errors in the received word, only up to triple errors can be located in the information part, so that these errors can be corrected in a maximum of three (3) steps. Comparable BCH codes can correct only all single and double errors using a circuit based on the Berlekamp-Massey algorithm. In addition, such cyclic BCH codes require complicating computing and logic circuitry in the decoder.

An additional advantage is that of all possible correctable error patterns, only a maximum of 3 bit errors are located in the message-carrying part of the code word.

Since it is possible to clearly separate two different clock phases in time, the decoding can be accelerated.

BRIEF DESCRIPTION OF THE DRAWING

Above-mentioned and other features and objects of this invention will become more apparent by reference to the following description taken in conjunction with the accompanying drawing, in which:

FIG. 1 is a block diagram of an encoder for a quasi-cyclic (36,24) code;

FIG. 2 shows clock signals $T_1$, $T_2$, and $T_3$ used in the encoder of FIG. 1;

DESCRIPTION OF THE PREFERRED EMBODIMENT

Figure 3:
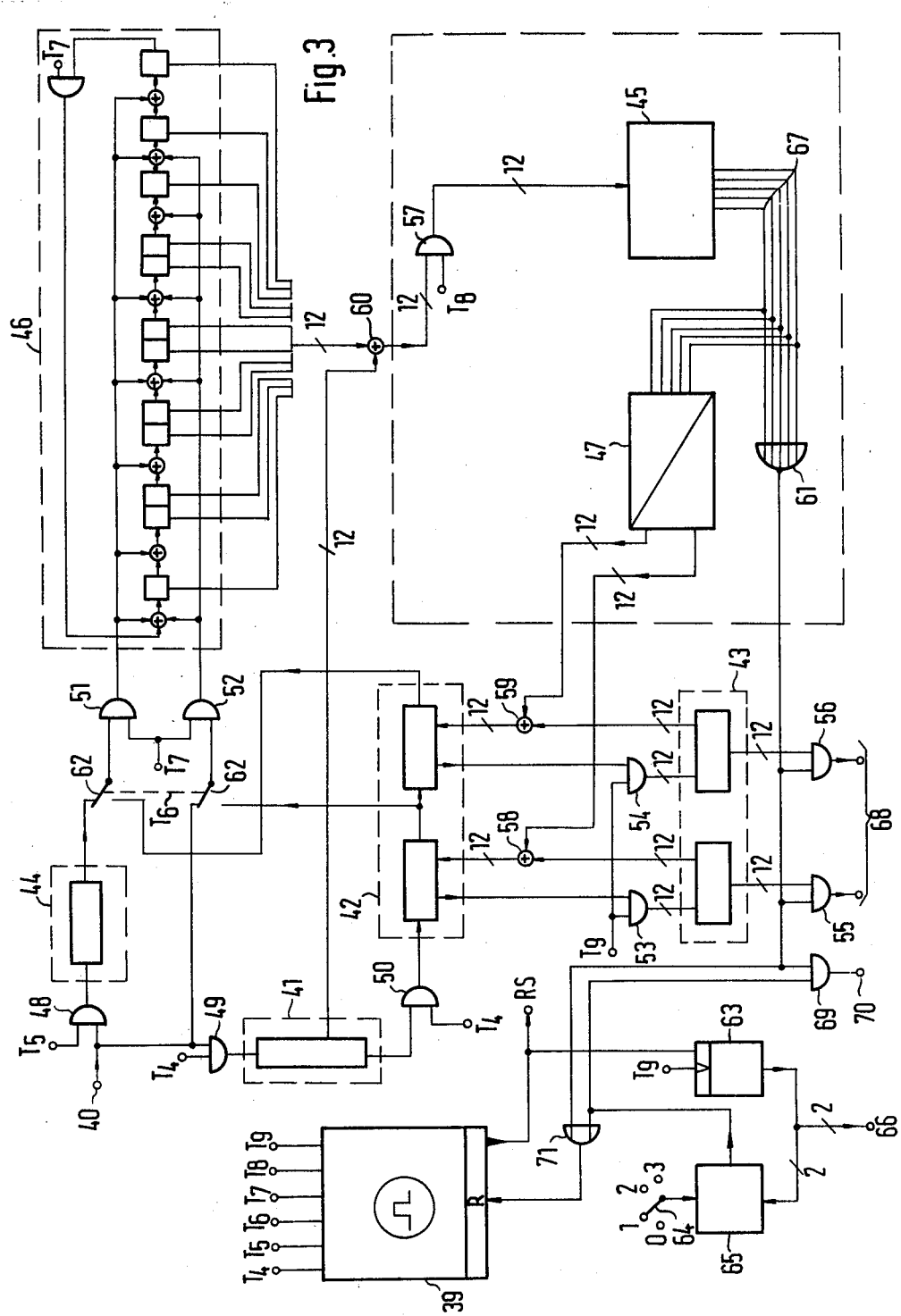
FIG. 3 is a block diagram of a decoder for the quasi-cyclic (36,24) code.

The invention will be described as applied to an embodiment using a quasi-cyclic (36,24) code. This code consists of $n=36$ bits per code word, with $k=24$ information bits and $n-k=12$ check bits which are referred to hereinbelow as the redundant part or redundant matrix. The code is called a "quasi-cyclic code" because the redundancy matrix can be separated into cyclic submatrices. Generally speaking, the redundant part as the quasi-cyclic code consists of code words in the form 3i, 2i for n and k, where i is an integer greater than or equal to 4.

Although the quasi-cylic (36,24) code is not a cyclic code and is first present only in the form of the generator matrix, the formation of a code word requires no matrix multiplication, which can be implemented in the encoder only with very complicated circuitry. Because of the special properties of the code and the special division of the information part of a code word, it suffices to use a feedback shift register with only one backing store.

In the decoder, the syndrome of the received word is calculated. By a "syndrome" a row vector of r components is understood which is obtained by regarding a code word of a (n,k) code as a (1,n) matrix (code vector) and multiplying this code vector by the transposed (r,n) parity-check matrix, with $r=n-k$.

If the syndrome is not equal to the zero vector, incompatibility exists between coded and decoded information; such incompatibility is caused by transmission errors, for example.

For the code used, $2^{12}$ different possible syndromes are obtained. Each of the $2^{12}=4,096$ syndromes is assigned the position of one bit error in the information part of the received word or zero. The value of the syndrome specifies the address of a memory location which normally contains the position of a wrongly transmitted bit. If the location contains the zero word, this means that bit errors can only be located in the redundant part (the check bits). Then, no further syndrome calculations are performed. Since after the decoding operation only the 24 information bits are of interest, 5 bits suffice to identify the position of a bit error; this number of bits is calculated from $\log_2 k$.

After the correction of any bit error, the syndrome of the corrected word is calculated anew, and a procedure as described above is performed. After a maximum of three correction steps, i.e., after the syndrome has been calculated three times, all correctable errors have been removed from the information part of the received word. This means that up to 3 bit errors have been corrected in the information part.

The general way of encoding binary message-carrying information of a code word is to regard this word as a vector and multiply it by the generator matrix. In cyclic codes, there is an analogy between vectorial and polynomial representations, which greatly facilitates the encoding and decoding of this code, for simple shift-register circuits as are used in the encoder and decoder of this invention permit, among other things, addition, multiplication, and division of polynomials and, thus, simple encoding of cyclic or quasi-cyclic codes.

To encode the information bits of the quasi-cyclic (36,24) code used, i.e., the information bits $U_0, U_1, \ldots U_{23}$, would have to be multiplied by the generator matrix G, because this code is not cyclic.

If, however, the information bits are separated into two halves $U_0, U_1, \ldots U_{11}$ and $U_{12}, U_{13}, \ldots U_{23}$, the transition to the polynomial representation becomes possible. Then, the two halves $U_1(x)$ and $U_2(x)$ of the information bits are given by $$U_1(x) = \sum_{i=0}^{11} U_{12+1} \cdot x^i$$

-continued $$U_2(x) = \sum_{i=0}^{11} U_i x^i$$

The code polynomial is then $$c(x) = [U_1(x) \cdot x^{24}] + [U_2(x) \cdot x^{12}] + p(x),$$

so that the check polynomial for the code chosen is $$p(x) = ([U_1(x) \cdot g_1(x)] + [U_2(x) \cdot g_2(x)])/(1 + x^{12}).$$

With the code chosen, $$g_1(x) = 1 + x + x^3 + x^5 + x^7 + x^{10} + x^{11}$$

$$g_2(x) = 1 + x^5 + x^7 + x^9 + x^{10}.$$

FIG. 1 is a block diagram of the encoder, and FIG. 2 shows clock signals $T_1$, $T_2$, and $T_3$ used in the encoder, with the numbers along the time axis each representing one bit period.

The first 12 information bits $U_1(x)$ (bits $U_0$ to $U_{11}$) coming from a data source (not shown) and applied to the input 1 are transferred to a buffer memory 2 and, at the same time, pass through an AND gate 3, whose other input is fed with the clock signal $T_1$, and a following OR gate 8 to an output 29. The buffer memory permits simultaneous processing of the first and second code halves. The next 12 information bits $U_2(x)$ (bits $U_{12}$ to $U_{23}$) are applied to a modulo-2 adder 21 via an AND gate 5 under the control of the clock signal $T_2$. At the same time, $U_1(x)$ is transferred from the buffer memory 2 through an AND gate 4 to the modulo-2 adder 21, whose result is fed into a first stage 9 of a shift register 30. In addition, $U_2(x)$ passes through the AND gate 3 and the OR gate 8 to the output 29. The first stage 9 and the following stages 10 to 20 as well as the modulo-2 adder 21 and the following modulo-2 adders 22 to 28 represent a encoder circuit. The encoder circuit simultaneously multiplies the polynomials $U_1(x)$ by $g_1(x)$ and $U_2(x)$ by $g_2(x)$, adds the results of the multiplications, and forms the check polynomial p(x) by division by $d(x) = 1 + x^{12}$ (AND gate 6, which connects the output of the stage 20 to the modulo-2 adder 21 and is controlled by the clock signal $T_2$). At the end of every clock pulse $T_2$, the first of the 12 check bits is stored in the shift-register stage 20, and after another 12 bit periods, the 12 check bits have been added to the information bits via an AND gate 7 (clock signal $T_3$) connected to the stage 20 and via the OR gate 8. The output 29 thus provides the code polynomial c(x), i.e., the bits $c_0$ to $c_{35}$. The following transmitting equipment, the transmission channel, and the necessary clock generator are not shown.

Figure 4:
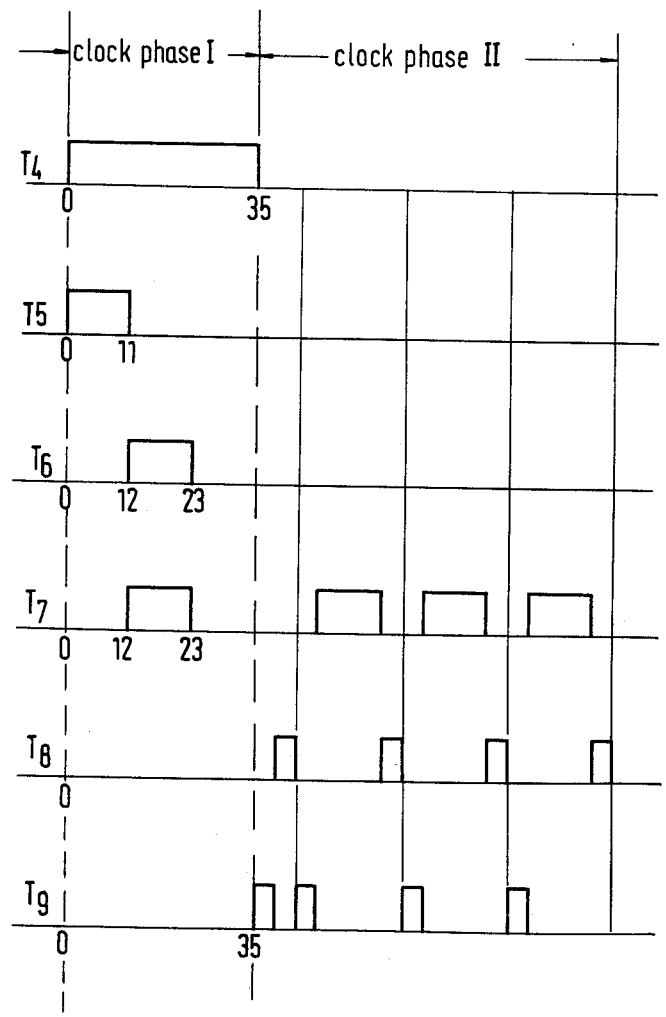
FIG. 4 shows clock signals $T_4$ to $T_9$ used in the decoder of FIG. 3.

FIG. 3 is a block diagram of the cyclic decoder, and FIG. 4 shows the clock signals $T_4$ to $T_9$ used therein, with the numbers along the time axis each representing one bit period.

The receiver portions ahead of an input 40 are not shown. The clock generator is designated 39. From the input 40, the first 12 bits of the received 36-bit word are transferred via an AND gate 48 into a buffer memory 44 and, at the same time, via an AND gate 49 into a preregister 41, having one serial output and 12 bit-parallel outputs, under control of the clock signals $T_4$ and $T_5$, respectively. The buffer memory 44 permits two cyclic code halves to be processed simultaneously.

A 2-pole switch 62 has its first movable contact connected to one of the two inputs of an AND gate 51, while its second movable contact is connected to one of the inputs of an AND gate 52; the other inputs of these gates are presented with the clock signal $T_7$. The first break contact of the switch 62 is connected to the output of the buffer memory 44 and the second break contact is connected to the input 40. The first make contact is connected to the output of a sum register 42 consisting of two similar 12-bit registers, and the second make contact is connected to the center tap of the sum register 42. The switch 62 is controlled by the clock signal $T_6$. During the clock signal $T_6$, the two-pole switch 62 is in the upper position, and under control of the clock signal $T_7$, the respective first and second information bits $U_1(x)$ and $U_2(x)$ pass simultaneously through the AND gates 51 and 52, respectively, to the inputs of a feedback shift register 46, which differs from the shift register 30 of FIG. 1 only in that each of its stages has an additional bit-parallel output. With the aid of this shift register 46, the 12 check bits belonging to the received information bits are calculated during every clock pulse $T_7$. The syndrome of the received word is obtained by adding these 12 check bits to the 12 check bits of the received word which are held in the preregister 41. The addition is performed in a bit-parallel manner with 12 modulo-2 adders 60, which are connected to the bit-parallel outputs of the shift register 46.

During every clock pulse $T_8$, the 12-bit word so obtained passes through 12 AND gates 57 and is applied to the address input of a read-only memory 45. The address thus called upon specifies the position of that erroneous information bit in the received word which is located at the smallest distance from the redundant part. Since only bit errors in the information part are corrected with this error-correcting technique, 5 bits suffice for the binary representations of the possible positions of a bit error, as explained earlier. These 5 bits are available at the data output 67 of the read-only memory 45 during every clock pulse $T_8$. A following code converter 47 converts these 5 bits into a 24-bit error pattern having only a single 1 in the position addressed by the 5 bits. This error pattern and the contents of a backup register 43 consisting of two similar 12-bit registers are added by 12 modulo-2 adders 58 and 12 modulo-2 adders 59, and the sums are transferred in parallel into the sum register 42, whose input is connected to the output of the preregister 41 via an AND gate 50. The second input of the AND gate 50 is fed with the clock signal $T_4$. The backup register 43 holds the information part of the received word which was copied from the sum register 42 via 12 AND gates 53 and 12 AND gates 54 during every clock pulse $T_9$. If the received word contained a correctable error pattern, the first of possibly two or more bit errors of the information part stored in the sum register 42 was corrected. By the following clock pulse $T_9$, the contents of the shift register 42 are again copied to the backup register 43.

With the corrected information part, a new syndrome is calculated via the shift register 46 in the manner described above, the switch 62 now being in the lower position. If the syndrome is zero, a zero word or an indication of bit errors located exclusively in the redundant part will appear at the data output 67 of the read-only memory 45. The output of a NOR gate 61 connected to the data output 67 then provides a logic 1, which enables 12 AND gates 55 and 12 AND gates 56, whose respective other inputs are connected to the outputs of the backup register 43, and which make available the information bits copied into the back-up register 43 at the output 68. The further processing of the information bits is not shown.

If the syndrome is nonzero and points to further bit errors in the information part, the above-described process will be repeated with the corrected information part by changing the switch 62 to the other position.

With a counter 63, the number of errors in the received word is determined via the number of correction cycles; each clock pulse $T_9$ represents a count pulse for the counter 63. The count is delivered simultaneously with the corrected information bits via an output 66.

This counting circuit can be expanded with a comparator 65, which is settable by a switch 64. If the received word contains an error which requires more correction cycles than are set by means of the switch 64, i.e., number of correction cycles=switch position (number of errors)+1, the correction will be interrupted and a signal indicating a decoding failure will be provided at a further output 70. The correcting capability of the decoder can thus be set so that no error or a maximum of one, two or thre errors in the information part of the received code word will be corrected.

When the set number of errors is reached, the comparator 65 provides a reset signal R, which is applied via an OR gate 71 to the clock generator 69 and restores the latter to its initial state.

If the decoder has already corrected a word with a smaller number of errors than the set number, the clock generator will be reset by the signal from the OR gate 61 via the OR gate 71. With the reset signal RS provided by the clock generator 39, all working registers with the exception of the backup register 43 are cleared.

The end of the clock pulse $T_4$ marks the end of the clock phase I, during which the sequence control of the decoder must be in synchronism with the received bit-rate clock. In the subsequent clock phase II, the sequence of operations can be faster, so that the decoding time is reduced. This can be achieved, for example, by increasing the frequency of the clock generator.

In simplex transceivers containing the encoders and decoders described, the shift register 46 in the decoder can also be used as the shift register 30 in the encoder (not shown).

This decoding procedure requires a memory capacity of 4,096 locations capable of containing 5 bits each. If the memory requirements are a critical quantity, it is possible to halve the 4,096 memory locations.

To halve the memory requirements, a relatively small amount of additional logic circuitry and an additional time of 12 shift pulses per correction step are required. On the other hand, the code converter can be somewhat simpler than that of FIG. 3.

With the clock signal $T_8$, the syndrome has so far been released as the address for the read-only memory 45. The clock signal $T_8$ now enables the syndrome to be transferred in a bit-parallel manner to a feedback shift register. In this shift register, the rightmost bit position is checked for a binary 1. The syndrome is cyclically shifted there until a binary 1 appears after a maximum of eleven steps in the bit position being monitored, or the shifting is discontinued after 12 steps if the syndrome is zero. If the syndrome is nonzero, the first eleven right-hand bits in the shift register specify the address of that location in the read-only memory which holds a zero or, identified by five bits, the position of a bit error in the 24-bit information part. The five bits of the bit error position are assigned so that if the fifth bit is a 1, for example, the error lies in the 1st half of the information part, while if the fifth bit is a 0, the error lies in the second half of the information part (or vice versa).

The code converter converts the four remaining bits into a 12-bit word, which is written into the shift register. In the shift register, the cyclic permutation steps remaining from 12 are carried out. This difference was determined by a counter during the shifting of the syndrome and the monitoring of the rightmost bit position of the shift register.

After this number of cyclic permutation steps, the shift register contains the error word, with the fifth bit from the read-only memory indicating whether this error word belongs to the first or second half of the information bits. The correction of the information bits is then performed by bit-parallel modulo-2 addition. The remaining steps are analogous to those already described.

Figure 5:
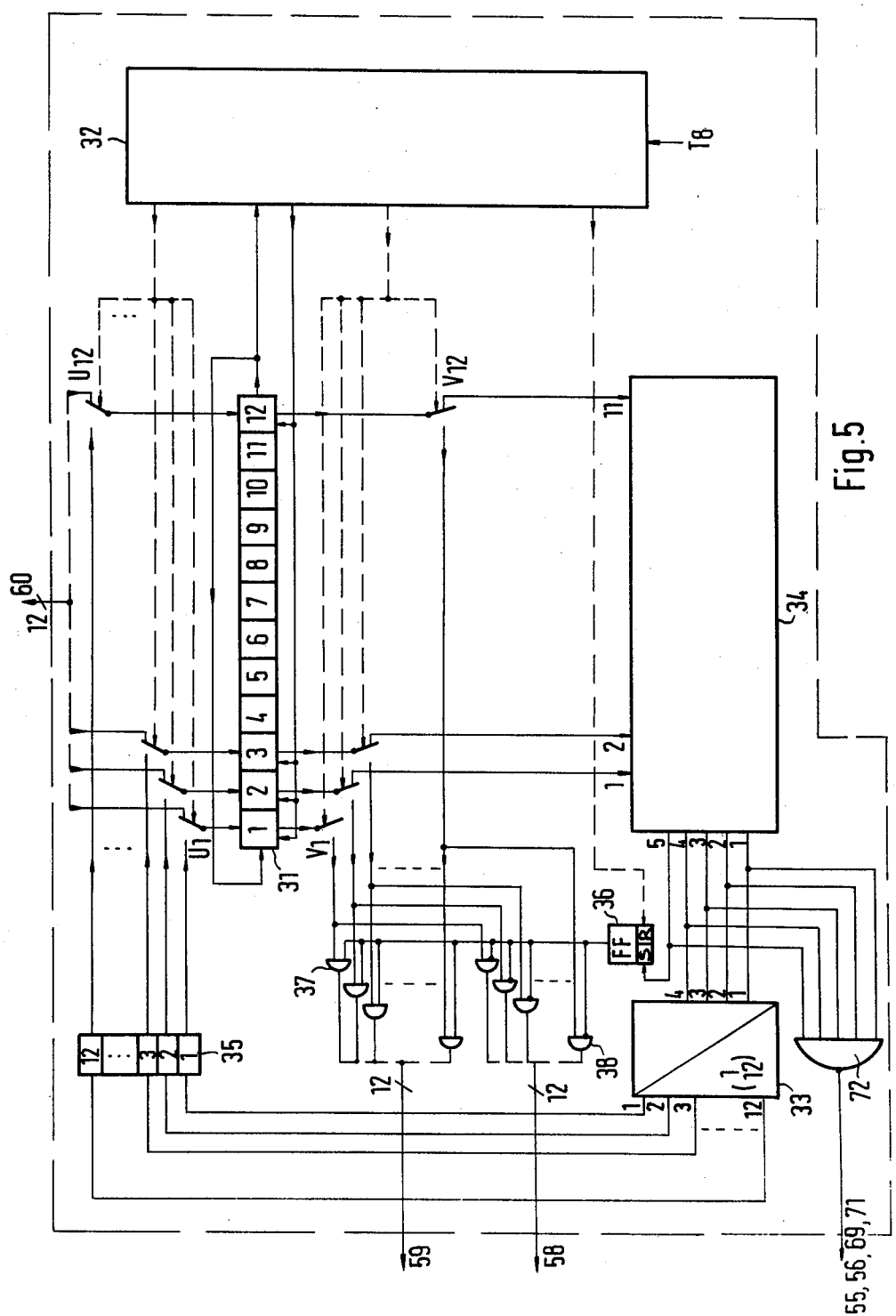
FIG. 5 is a block diagram of another embodiment of the portion surrounded by a broken line in FIG. 3.

The block diagram of an embodiment of a circuit for reducing memory requirements to 2,047 locations capable of containing 5 bits each is shown in FIG. 5. It can replace the portion enclosed by a broken line in FIG. 3.

The syndrome is transferred into the 12-stage shift register 31 in bit-parallel form. The output of the shift register is monitored for the appearance of a binary 1 by an additional logic 32. If the output of the shift register provides a binary 1, no shift pulse will be delivered by the additional logic 32. If the output of the shift register is zero, the contents of the shift register 31 will be shifted one place until a binary 1 appears. The number of places the contents of the shift register are shifted until another binary 1 appears at the output of the shift register provides, in a counter contained in the additional logic and preset to 12, the difference of the cyclic shift steps to be subsequently performed with the error pattern.

As soon as a binary 1 appears at the output of the shift register 31 in the course of the syndrome shifts, the shift signal will be removed both from the shift register and from the preset counter in the additional logic.

By an enable signal from the additional logic 32, the cyclically shifted syndrome, with the first 11 right-hand bits as the address, is transferred into the read-only memory 34. The bit position associated with these eleven bits is passed on to the code converter 33, which forms therefrom a 12-bit word as the associated error pattern. This error pattern is transferred into a buffer memory 35. At the same time, the fifth bit position from the read-only memory 34 sets an RS flip-flop 36.

Changeover switches $U_1$ to $U_{12}$ connect the inputs of the shift register 31 either to the outputs of the modulo-2 adders for transfer of the syndrome or to the outputs of the buffer memory 35 for transfers of the error pattern. After the error pattern has been transferred into the buffer memory 35, the changeover switches $U_1$ to $U_{12}$ are placed in their other positions by a control signal from the additional logic 32. Thus, the error pattern is transferred into the shift register 31 in bit-parallel form. As soon as this operation is terminated, the additional logic 32 applies the shift signal to the shift register 31 and the counter again. The contents of the shift register 31 must be shifted until the counter indicates a zero difference.

Changeover switches $V_1$ to $V_{12}$ connect the outputs of the shift register 31 either to the inputs of the read-only memory 34 for entering the address or to the first inputs of two times 12 AND gates 37 and 38 for delivery of the error pattern. The respective second inputs of the AND gates 37 and 38 are connected to the output of the RS flip-flop 36. The changeover switches $V_1$ to $V_{12}$ are now placed in the other position by a control signal from the additional logic 32, and the error pattern can be delivered from the shift register 31. Under control of the RS flip-flop 36 and the AND gates 37 and 38, the 12-bit error pattern is now applied to the first or second half of the 24-bit output and, thus, to the inputs of the modulo-2 adder 58, 59 of FIG. 3, where it is available for correcting the information bits as described above.

Connected to the output of the read-only memory 34 is a NAND gate 72, which upon delivery of the zero word provides a logic 1 to the AND gates 55, 56, 69 and the OR gate 71 of FIG. 3 to stop the correction.

The additional logic 32 is a simple auxiliary circuit for controlling the operations described, such as counting, clock transfer, and deriving the control signals for switching over the changeover switches U and V, so that no further explanation appears necessary.

While we have described above the principles of our invention in connection with specific apparatus, it is to be clearly understood that this description is made only by way of example and not as a limitation to the scope of our invention as set forth in the objects thereof and in the accompanying claims.

We claim:

1. A system for binary data transmission comprising:
   an encoder including
      a first k/2-stage shift register means to convert an input binary signal to be transmitted into n-bit code words of a quasi-cyclic code with k information bits, where n and k are different integers greater than one; and
   a decoder having an error-detection and error-correction arrangement including
      a second k/2-stage shift register means having an input receiving said n-bit code words of said quasi-cyclic code to calculate from each of said code words a syndrome whose value is used as an address of a location in a read-only memory means having a predetermined number of locations, said read-only memory means delivering from said address location a selected one of first information specifying the position of an erroneous bit in said information bits and second information terminating a correction,
      a code converter means coupled to said read-only memory means to convert said first information into a k-bit error pattern,
      modulo-2 adder means coupled to said code converter means and said input to add said error pattern to said information bits to produce corrected information bits,
      first means coupled to said second shift register, said read-only memory means and said modulo-2 adder means to enable locating and correcting a selected number of errors in said information bits by operating on each new corrected information bits as produced above by said read-only memory means, said code converter and said modulo-2 adder means, and
      second means coupled to said modulo-2 adder means and said read-only memory means to provide a corrected output signal from which said input binary signal can be derived in response to a selected one of said second information and said corrected information bits after said selected number of errors hav been corrected.

2. A system according to claim 1, wherein said read-only memory means includes
- a read-only memory having a small number of locations, and
- an additional shift register coupled between said second shift register and said read-only memory to process said calculated syndrome and produce therefrom said address of said location in said read-only memory which contains said selected one of said first and second information, said first information being converted into said error pattern by said code converter means and said additional shift register.

3. A system according to claim 2, wherein said quasi-cyclic code is formed by said code words having n equal to 3i bits and k equal to 2i bits, where i is an integer greater than three.

4. A system according to claim 2, wherein said quasi-cyclic code is formed by said code words having n equal to 36 bits which include k=24 information bits and n-k equal to 12 check bits, and said quasi-cyclic code further includes a redundancy matrix composed of two cyclic submatrixes of the same size.

5. A system according to claim 2, wherein said decoder is operated at a higher clock rate during a second clock phase than during a first clock phase.

6. A system according to claim 2, wherein said selected number of errors equal three.

7. A system according to claim 1, wherein said quasi-cyclic code is formed by said code words having n equal to 3i bits and k equal to 2i bits, where i is an integer greater than three.

8. A system according to claim 1, wherein said quasi-cyclic code is formed by said code words having n equal to 36 bits which include k=24 information bits and n-k equal to 12 check bits, sand said quasi-cyclic code further includes a redundancy matrix composed of two cyclic submatrixes of the same size.

9. A system according to claim 1, wherein said decoder is operated at a higher clock rate during a second clock phase than during a first clock phase.

10. A system according to claim 1, wherein said selected number of errors equal three.

11. In a system for binary data transmission, a decoder having an error-detection and error-correction arrangement comprising:
- a k/2-stage shift register means having an input to receive n-bit code words of a quasi-cyclic code with k information bits employed to transmit a binary signal, where n and k are different integers greater than one, said shift register means calculating from each of said code words a syndrome whose value is used as an address of a location in a read-only memory means having a predetermined number of locations, said read-only memory means delivering from said addressed location a selected one of first information specifying the position of an erroneous bit of said information bits and second information terminating a correction;
- code converter means coupled to said read-only memory means to convert said first information into a k-bit error pattern;
- modulo-2 adder means coupled to said code converter means and said input to add said error pattern to said information bits to produce corrected information bits;
- first means coupled to said shift register, said read-only memory means and said modulo-2 adder means to enable locating and correcting a selected number of errors in said information bits by operating on each new corrected information bits as produced above by said read-only memory means, said code converter and said modulo-2 adder means; and
- second means coupled to said modulo-2 adder means and said read-only memory means to provide a corrected output signal from which said binary signal can be derived in response to a selected one of said second information and said corrected information bits after said selected number of errors have been corrected.

12. A decoder according to claim 11, wherein said read-only memory means includes
- a read-only memory having a small number of locations, and
- an additional shift register coupled between said shift register and said read-only memory to process said calculated syndrome and produce therefrom said address of said location in said read-only memory which contains said selected one of said first and second information, said first information being converted into said error pattern by said code converter means and said additional shift register.

13. A decoder according to claim 12, wherein said quasi-cyclic code is formed by said code words having n equal to 3i bits and k equal to 2i bits, where i is an integer greater than three.

14. A decoder according to claim 12, wherein said quasi-cyclic code is formed by said code words having n equal to 36 bits which include k=24 information bits and n-k equal to 12 check bits, and said quasi-cyclic code further includes a redundancy matrix composed of two cyclic submatrixes of the same size.

15. A decoder according to claim 12, wherein said decoder is operated at a higher clock rate during a second clock phase than during a first clock phase.

16. A decoder according to claim 12, wherein said selected number of errors equal three.

17. A decoder according to claim 11, wherein said quasi-cyclic code is formed by said code words having n equal to 3i bits and k equal to 2i bits, where i is an integer greater than three.

18. A decoder according to claim 11, wherein said quasi-cyclic code is formed by said code words having n equal to 36 bits which include k=24 information bits and n-k equal to 12 check bits, and said quasi-cyclic code further includes a redundancy matrix composed of two cyclic submatrixes of the same size.

19. A decoder according to claim 11, wherein said decoder is operated at a higher clock rate during a second clock phase than during a first clock phase.

20. A decoder according to claim 11, wherein said selected number of errors equal three.

* * * * *